(12) United States Patent
Honda et al.

(10) Patent No.: US 6,477,353 B1
(45) Date of Patent: Nov. 5, 2002

(54) MOBILE WIRELESS TRANSCEIVER METHOD AND APPARATUS

(75) Inventors: Ryohjj Honda, Saitama-ken; Fumihiko Kitayama, Sagamihara; Kazushi Kuse, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/260,246

(22) Filed: Mar. 2, 1999

(30) Foreign Application Priority Data

Mar. 30, 1998 (JP) .......................................... 10-084187

(51) Int. Cl.$^7$ .............................. H04B 1/38; H04Q 7/38
(52) U.S. Cl. ........................... 455/5; 455/456; 455/11.1
(58) Field of Search ......................... 701/225; 340/934, 340/989, 991; 342/357.1, 357.08; 455/575, 517, 41, 456

(56) References Cited

U.S. PATENT DOCUMENTS

| | | | | |
|---|---|---|---|---|
| 4,533,871 A | * | 8/1985 | Boetzkes | 324/207 |
| 4,764,982 A | * | 8/1988 | Pfund | 455/606 |
| 4,941,200 A | * | 7/1990 | Leslie et al. | 455/17 |
| 4,995,101 A | * | 2/1991 | Titterton et al. | 455/607 |
| 5,218,467 A | * | 6/1993 | Ross et al. | 359/172 |
| 5,355,511 A | * | 10/1994 | Hatano et al. | 455/11.1 |
| 5,602,740 A | * | 2/1997 | Nishiyama | 364/449.1 |
| 5,666,661 A | * | 9/1997 | Grube et al. | 455/509 |
| 5,801,866 A | * | 9/1998 | Chan et al. | 359/172 |
| 6,091,956 A | * | 7/2000 | Hollenberg | 455/456 |

FOREIGN PATENT DOCUMENTS

| | | | | |
|---|---|---|---|---|
| JP | 8102708 | 4/1996 | | H04B/7/26 |
| JP | 8275245 | 10/1996 | | H04Q/7/26 |
| JP | 9252277 | 9/1997 | | H04B/7/26 |
| JP | 1032538 | 2/1998 | | H04B/7/26 |

OTHER PUBLICATIONS

Patent Abstracts of Japan, Publication No. 10032538, Feb. 3, 1998, Mobile Communication Method and Device, F. Masaaki et al.

Patent Abstracts of Japan, Pub. No. 08102708, Apr. 16, 1996, Mobile Communication Repeater Station and Mobile Communication Terminal, A. Takashi.

Patent Abstracts of Japan, Pub. No. 09252277, Sept. 22, 1997, Relay System in Mobile Communication, K. Noriaki.

Patent Abstracts of Japan, Pub. No. 08275245, Oct. 18, 1996, Radio Communication System, T. Terumasa.

* cited by examiner

*Primary Examiner*—Dwayne Bost
*Assistant Examiner*—Miguel D. Green
(74) *Attorney, Agent, or Firm*—Jeanine S. Ray-Yarletts

(57) ABSTRACT

Information transmitted from an information origin is transferred from one mobile station to another. At this time, in the mobile station, the transmission of the information is controlled so that the information is not transmitted to a distance more than a predetermined value from the position of the information origin. A valid period of the information is defined and only the information within the valid period is transmitted. Alternatively, controls are carried out in order to avoid overlapping of the transfer paths and detours of them. Particularly, if a density of the mobile stations becomes high, the quantity of the information to be transferred increases tremendously. Therefore, it is necessary to select and limit the information to be transferred. If the mobile station is a portable information terminal and a personal user has this portable information terminal, the information origin is a retail store and transmits special sale information and the like as well as position information. The user holding the portable information terminal may go to the special sale store after seeing the special sale information, and if he feels no interest in it, he leaves the special sale store. When the user is walking on the street after leaving the store, the portable information terminal held by the user who was in the store exchanges information with an information portable terminal of the other users. While repeating the exchange of the information, the information reaches to a person who has an interest in the special sale information.

9 Claims, 6 Drawing Sheets

| 1 | 2 | 3 | 4 | 5 | 6 | 7 | 8 |
|---|---|---|---|---|---|---|---|
| TRANSMISSION SOURCE POSITION | TRANSMISSION SOURCE TIME | TRANSMISSION SOURCE VELOCITY | INFORMATION CATEGORY | INFORMATION ORIGIN POSITION | INFORMATION ORIGIN TIME | THRESHOLD VALUE | INFORMATION |

FIG.4

MOBILE WIRELESS TRANSCEIVER METHOD AND APPARATUS

FIELD OF THE INVENTION

The present invention relates to a wireless communication system in which a mobile station relays a wireless signal sent from a base station to other mobile stations using a weak radio wave, more particularly to a method for transferring a wireless signal among the mobile stations in this wireless communication system.

BACKGROUND ART

The following is disclosed in Japanese Published Unexamined Patent Application No. Hei 9-252277. Referring to FIG. 1. Information transmitted from the fixed station (101) is first received by the mobile station A (103) and the information is processed by the station A. Then, the information is relayed to the mobile station B (105). Thereafter, the information is sequentially relayed to the mobile stations C (107) and D (109) from the mobile station B (105). In such manner, it becomes possible to transmit the information in a wide area with a small power by relaying the information. Moreover, the value of a re-transmitting counter is included in a transmitting frame, and the value of the re-transmitting counter is incremented by one after every relay. It is determined, according to the value of the re-transmitting counter whether the information is to be relayed or not. The present invention depicts that the information can be localized by implementing this method. However, a problem may be created if the information to be relayed is determined based on the number of relays. For example, if the relay is performed among the mobile stations located at short distances or close to one another, a problem arises that the limitation to the number of relays is reached before the information has propagated far from the fixed station.

The following is also disclosed in Japanese Published Unexamined Patent Application No. Hei 10-32538. Referring to FIG. 2. The mobile object CR1 collects data as to the present position and time from the GPS (Global Positioning System) apparatus GP1 during its running, and based on the data the running locus (course of travel) until the present time, the average speed, the elapsed time, the degree of the traffic congestion and the like on the course are stored in the memory MM1 as traffic information message MS1. Moreover, there is the following description relating to FIG. 3. "It is assumed that the mobile object CR1 and the mobile object CR2 become proximate with one another so that they are capable of communicating with each other. The mobile object CR2 sends the traffic information message MS2-2 stored therein to the mobile object CR1, and the mobile object CR1 sends to the mobile object CR2 the traffic information messages MS1 which is being possessed by the mobile object CR1 and the mail information message MS6 addressed to the computer, which is to be transmitted. In the traffic information message MS1 received by the mobile object CR2 important parts for the mobile object CR2 are displayed on the display device DS2 as newly-received information. Similarly, in the traffic information message MS2-2 received by the mobile object CR1, important parts for the mobile object CR1 are displayed on the display device DS1 as newly-received information. Although the message transfer system of this embodiment possesses no guarantee for data arrival, essentially, the arrival rate must be increased as high as possible. Since there are actually many mobile objects running in the same area, traffic information data concerning a certain area/route will be sequentially updated to the latest data. Particularly, in the case where traffic snarls occur as in Japan, other mobile objects are always present around a certain mobile object, it will be possible to exchange messages with substantially the same high speed and in the same wide range as those in a wired network. Moreover, there is a description in which since instant messages need not be transmitted in a wide range, the messages are not stored for a long time and are soon deleted. However, the prior art contains no description in which it is judged how instant the messages are and at what time the messages should be deleted. Furthermore, there is no description as to a problem if many mobile stations are mal-distributed.

OBJECTS OF THE INVENTION

In the background arts described above, the mechanism in which the information transmitted from either the base station or the fixed station is exchanged among the mobile stations is disclosed. However, only the fact that the processing in the mobile stations to control the propagation of the information is performed by the number of relays is disclosed. Accordingly, the object of the present invention is to provide a method for controlling the propagation of information in a more reasonable style.

Another object of the present invention is to limit the propagation of the information to a predetermined range.

Still another object of the present invention is to avoid congestion of the information to be propagated.

Still a further object of the present invention is to enable the information to be propagated more efficiently.

SUMMARY OF THE INVENTION

The system that is the premise in the present invention is analogous to the foregoing background arts. Specifically, the information sent by the base station (the fixed station in FIG. 1) as shown in FIG. 1 is transmitted, for example, from the mobile station A to the mobile station B, from the mobile station B to the mobile station C, sequentially, whereby the information propagates from the mobile station A to the mobile station C. As shown in FIG. 2, each mobile station has at least the antenna AT1, the display device DS1, the receiver RX1, and the transmitter TX1, and receives wireless signals by the receiver RX1 via the antenna AT1 and presents the information necessary for the user of this mobile station among the received wireless signals to the user with the display device DS1. On the other hand, the mobile station transmits the wireless signal including specific information to other mobile stations from the transmitter TX1 using the antenna AT1. As shown in FIG. 3, when the mobile station CR2 communicates with the mobile station CR1, the mobile station CR2 sends the received information MS2-2 to the mobile station CR1, and the mobile station CR1 sends the stored information MS1 and MS6 to the mobile station CR2. Thus, the information is exchanged between the mobile stations CR1 and CR2.

As understood from the above descriptions, although the exchanges of the information among the mobile stations are performed similarly to the background arts, the present invention shows which information is propagated among the mobile stations. Specifically, in a mobile wireless transceiver, if it is determined that received information including position information of an information origin transmitting information initially is to be transferred, the following steps are executed: calculating a distance from the information origin using the position information; comparing the distance with a predetermined threshold; and determining that the received information is not to be transferred if the distance is greater than or equal to the predetermined threshold. Thus, the propagation of the information is limited to a specific area from the information origin, so that it is possible to transmit more localized information to users in a specific area.

As another aspect of the present invention, in a mobile wireless transceiver, if it is determined that received information is to be transferred, the following steps are executed: judging whether a valid period of receiving information has expired; and determining that the received information is not to be transferred if the valid period thereof has expired. Obsolete information shall not be transferred, so that an overflow of the transferred information can be prevented. Moreover, if the velocity of the mobile station is approximately constant, the propagation area of the information will be limited to a specific area remote from the information origin. In the background arts, the fact is recited, in which the instant information is not stored for a long period of time, and it is deleted. However, there is no description concretely reciting on how to judge whether the message is instant and at what time the instant message is deleted.

If the received information includes a transmitting time information of the information original initially transmitting the information, the step of judging whether a valid period of the received information is expired or not includes a step of judging by using the transmitting time information, whether a predetermined time has passed from a transmitting time. If the received information includes information concerning a valid period time by the information origin initially transmitting the information, the step of judging whether a valid period of the received information is expired or not includes a step of judging whether the present time has passed the valid period time.

As still another aspect of the present invention, in a mobile wireless transceiver, if it is determined that a received information includes position information of a transmission source to be transferred, the following steps are executed: detecting a density of the mobile wireless transceivers in the vicinity; calculating a distance from the transmission source by using the position information of the transmission source; judging whether the density and the distance satisfy a specific condition; and determining that the received information is not to be transferred if the density and the distance satisfy the specific condition. Thus, if the density of the mobile stations is high, the information from the mobile station located at a short distance from itself is not re-transmitted, whereby an overflow of transmitted information can be controlled, resulting in a more efficient information transfer.

It is conceived that the step of judging whether a density of the mobile stations and a distance from the transmission source satisfy a predetermined condition may include a step of judging whether the density is a specific value or more and the distance is a specific value or less. It is also conceived that the step of judging whether the density and the distance satisfy the predetermined condition may include a step of determining whether the density and the distance satisfy a predetermined relationship. Note that the formula for the predetermined relationship expresses that the re-transmission is not performed in the case where the density of the mobile stations are high and the information from the mobile station is received a short distance from the mobile station.

As still another aspect of the present invention, in a mobile wireless transceiver, if it is determined whether or not received information including position information of an information origin initially transmitting information as well as position information of a transmission source is to be transferred, the following steps are executed: judging whether an angle formed by a straight line connecting the information origin and the transmission source and a straight line connecting the transmission source and the transceiver itself is within a specific value, by using on the position information of the information origin and of the transmission source; and determining that the received information is not to be transferred, if the transceiver itself is not within the specific value of the angle. Thus, it becomes possible to propagate the information to a remote place more efficiently, thus preventing an overflow of information which is transferred in a narrow area.

It may be conceived that the specified value of the angle is determined depending on the density of the mobile wireless transceivers.

As still another aspect of the present invention, in a mobile wireless transceiver, if it is determined that received information including position information of an information origin initially transmitting information as well as position information of a transmission source is to be transferred, the following steps are executed: detecting an average distance from other transceivers; judging whether the transceiver itself is within an area surrounded by two straight lines which make contact with a circle, by using the position information of the information origin and the position information of the transmission source, the center of which is located at a position apart from the transmission source by a receiving limitation distance as well as on a straight line connecting the information origin and the transmission source, and the radius of which is equal to the average distance; and determining that the received information is not to be transferred if the transceiver itself is not with the area. Thus, it becomes possible to propagate the information to a remote place more efficiently, thus preventing a flood of the information which is transferred in a narrow area.

It can be also conceived that in this aspect, the following steps are further executed: judging whether a distance from the transmission source is equal to or longer than a value obtained by subtracting the average distance from the receiving limitation distance; and determining that the received information is not to be transferred if the distance from the transmission source is shorter than the value obtained by subtracting the average distance from the receiving limitation distance.

The above description of the present invention was made for processing in the mobile station. The present invention can be also implemented for a mobile wireless transceiver which executes such processing. Moreover, the present invention can be implemented for a program which executes such processing. Noted that the program is usually stored in memory devices such as a ROM (Read Only Memory) and storage mediums such as a CD-ROM.

BRIEF DESCRIPTION OF THE DRAWINGS

FIG. 4 is a diagram showing an example of a transmission frame.

DETAILED DESCRIPTION OF THE PREFERRED EMBODIMENT

Figure 1:
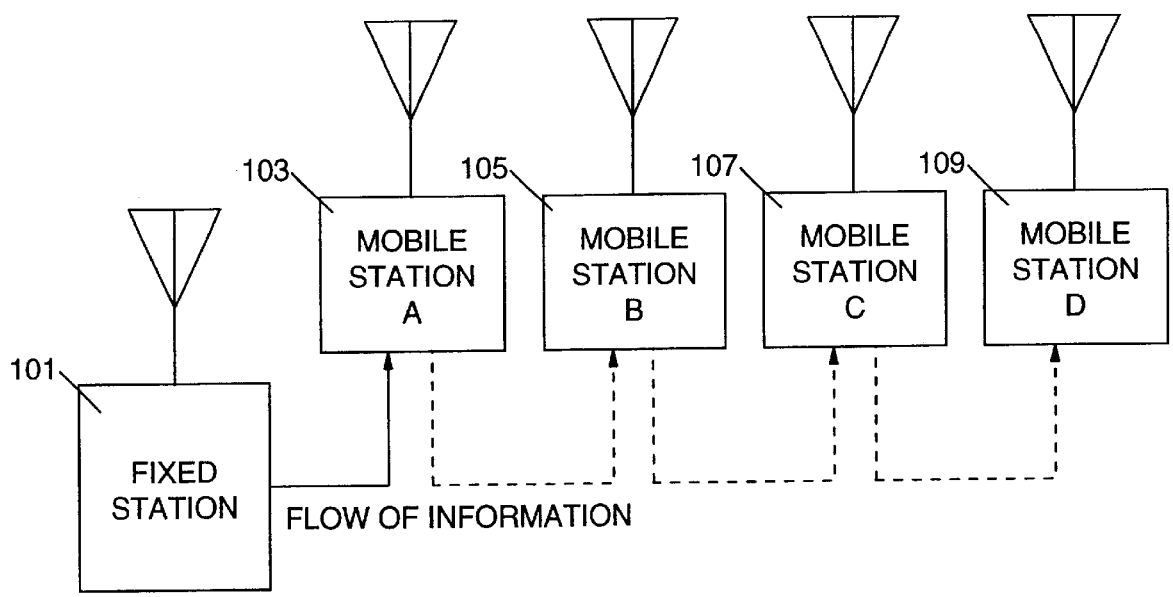
FIG. 1 is a diagram illustrating a premise of the background art and the present invention.
Figure 2:
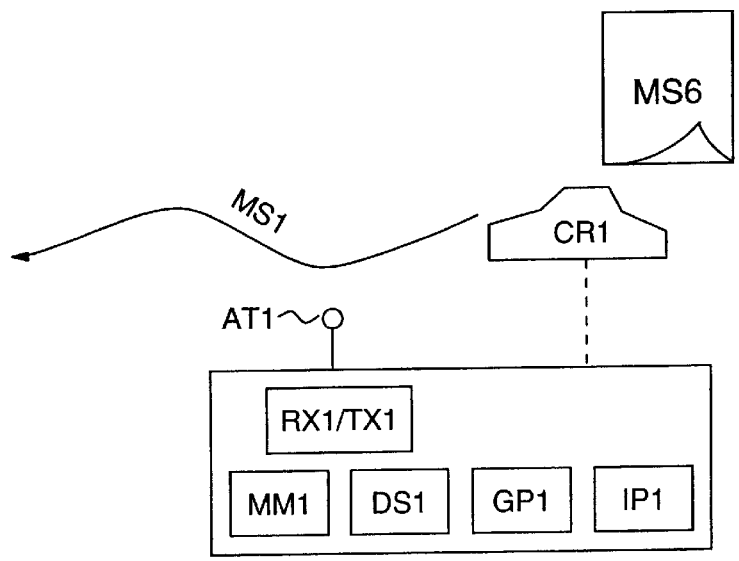
FIG. 2 is a diagram illustrating a premise of the background art and the present invention.
Figure 3:
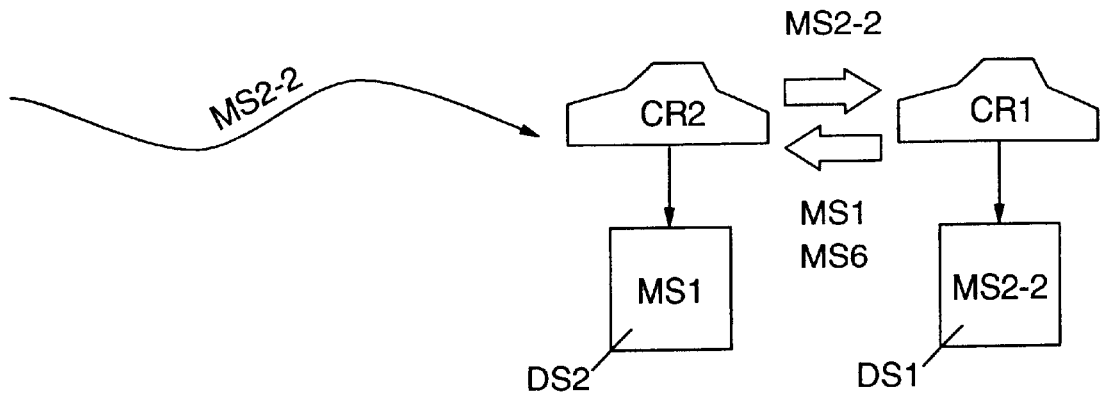
FIG. 3 is a diagram illustrating a premise of the background art and the present invention.

As described above, the premise that the information including the program sent out from the base station (fixed station) is transmitted by hopping it among the mobile stations as shown in FIG. 1, is applicable to the present invention. Therefore, in the following, a description is made using information transmitted from the base station, the constitution of the mobile station and processing executed in the mobile station, which are features of the present invention.

(1) The Transmitted Information from the Base Station

The base station is analogous to a broadcast station, which transmits its advertisement information. As described above, so that the information sent out from the base station is propagated to a specific area from the base station, the base station sends out either a position of the information origin or a time, or both of them along with the information to be transmitted. Moreover, a threshold value of either a distance or a time, which serves for discarding the information sent out, may be included therein. Alternatively, threshold values of both distance and time may be included. An example of a transmitting frame used in the present invention is shown in FIG. 4. When the base station transmits the information, the transmission source position 1 and the information origin position 5 are the same and the transmission source time 2 and the information origin time 6 are the same, respectively, so that any of them can be deleted. Moreover, since the base station does not move, the value of the transmission source speed 3 is deleted or made equal to zero. For the case of the mobile stations, it is preferable that a speed vector is inputted. Note that the transmission source speed 3 is provided optionally. The information category 4 is prepared by the information original. Bit arrays are previously made to correspond to the types that are, for example, an advertisement or a traffic information 8, and the bit arrays of the types corresponding thereto are inputted to the information category 4. The reason why such a method is adopted is in order to make it possible for the user to easily filter the necessary information. The threshold value 7 is set by the information origin. In case of the threshold value concerning the distance, the distance from the information origin is input. In case of the threshold value concerning the time, either the time to be discarded or the time from the information origin time is input.

Although it was described that the base station is a broadcasting station or the like, the base station may not be the one which transmits information one-sidedly, but may be constituted such that it is connected in wireless with the mobile station to communicate information therebetween. Alternatively, the base station may have a relay function like a mobile station as described later. Moreover, in the above description, that the base station is an information origin was premised. However, it is possible that the mobile station itself serves as an information origin.

(2) Constitution of the Mobile Station

Figure 5:
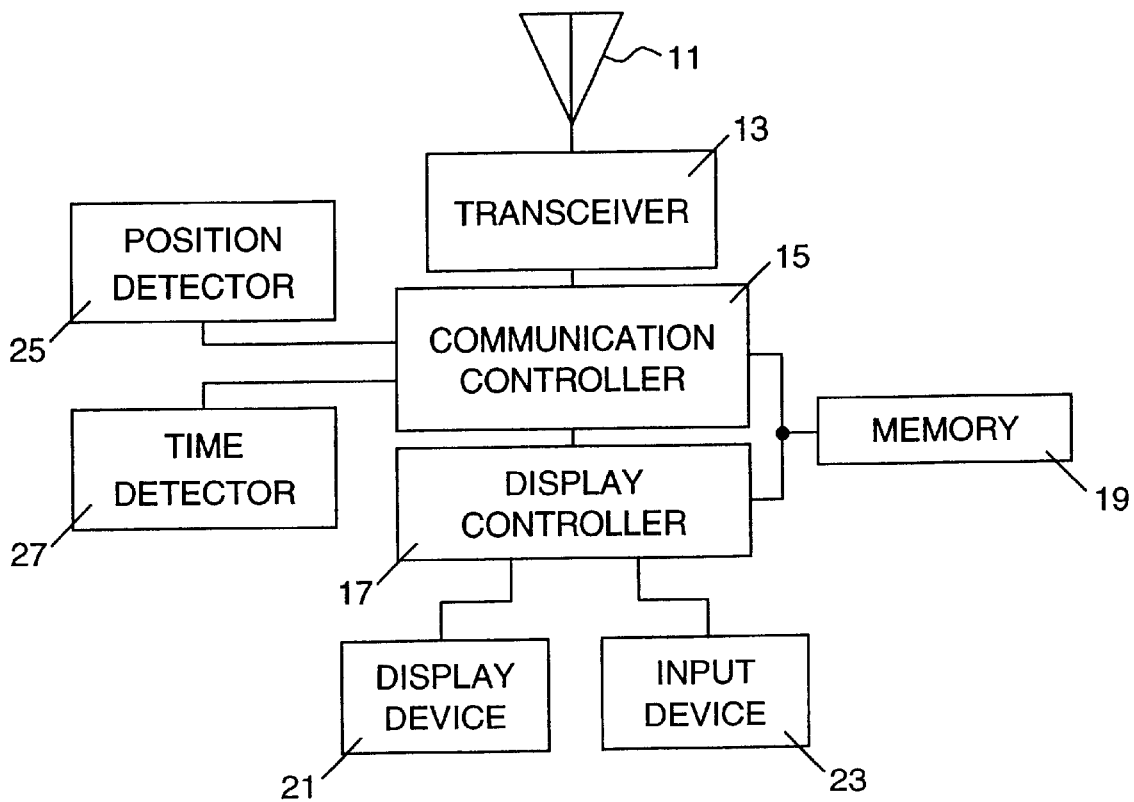
FIG. 5 is a block diagram showing an example of a mobile station in the present invention.

A block diagram showing a constitutional example of the mobile station is illustrated in FIG. 5. The transceiver 13 coupled to the antenna 11 is also connected to the communication controller 15. The display device 21 is connected to the display controller 17. The display controller 17 and the communication controller 15 are connected so as to control all of the mobile stations in cooperation with each other. Moreover, both are connected to the memory 19, and share the memory 19. The display controller 17 is connected to the input device 23. The communication controller 15 is connected to the position detector 25 and the time detector 27.

Although any kind of the transceiver 13 may be adopted, the transceiver 13 should be preferably the one using FM (frequency modulated) waves, infrared ray communications (IrDA) and the like. The transceiver 13 checks the timing of the connection with other mobile stations or the base station together with the communication controller 15 to perform communication with them. GPSs and PHSs (Personal Handphone Systems) can be employed for the position detector 25. In the case where the mobile station is a car, car navigation systems can be employed. Moreover, in the case where a speed sensor and an acceleration sensor exist, they can be employed. The information concerning the position is either two-dimensional (latitude, longitude) or three-dimensional (latitude, longitude and height). The time detector 27 may be a clock, a device acquiring time information from the GPS, or a device acquiring a time from a radio clock. The communication controller 15 can calculate the speed information concerning the mobile station, using the information from the position detector 25 and the time detector 27.

Next, an operation of the mobile station will be described. The transceiver 13 receives a wireless signal via the antenna 11, and transfers the received signal to the communication controller 15. The communication controller 15 stores the received information in the memory 19. The communication controller 15 also informs the display controller 17 concerning the receipt of the new information and an address in the memory 19. The display controller 17 confirms whether or not the information is to be displayed. As result of the confirmation, if the information is to be displayed, the display controller 17 reads out the information from the specified address in the memory 19, and displays it on the display device 21. The user can designate the information to be displayed using the input device 23. For example, if the user wants to know the traffic information, the user sets the display controller 17 so that the display device 21 displays the traffic information. Moreover, if information to be transmitted to other mobile stations exists in the memory 19, the communication controller 15 reads out the information from a specific address of the memory 19, and prepares the transmitting frame shown in FIG. 4, thus causing the transceiver 13 to transmit the information via the antenna 11.

Note that the communication controller 15 can also judge whether or not the communication controller 15 receives the entire frame, when the communication controller 15 receives the position information of the transmission source and the position information of the information origin located at the top of the frame shown in FIG. 4.

(3) Processing in the Mobile Station

Figure 6:
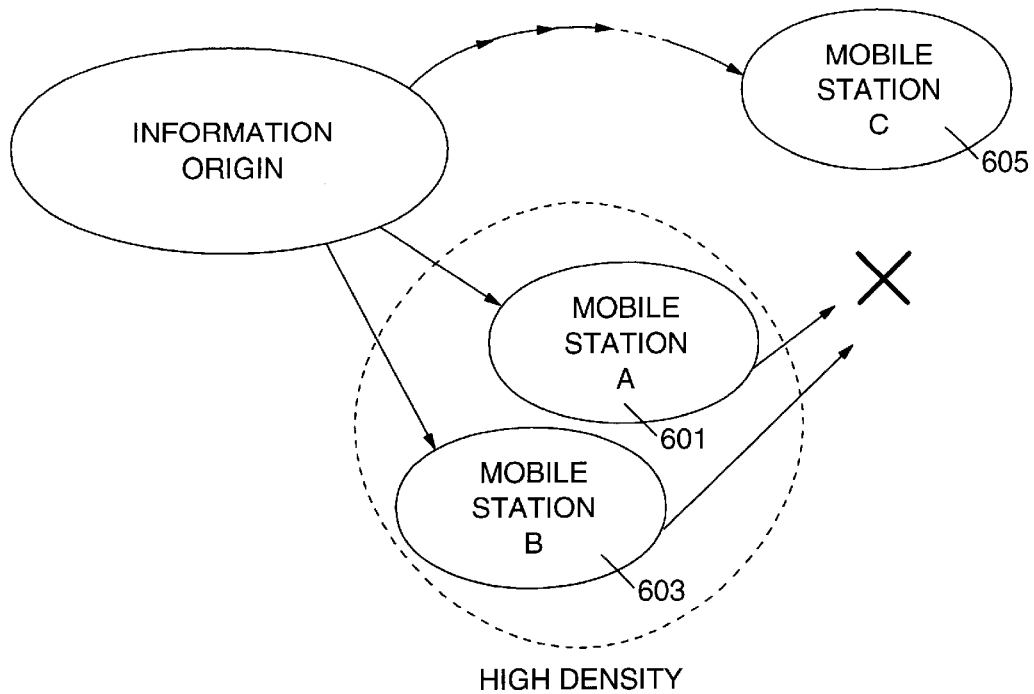
FIG. 6 is a diagram showing the case where no transmission of information is performed.

The communication controller 15 selects the information to be transmitted. Specifically, the communication controller 15 determines for each information whether or not the information is to be transmitted. This processing is conducted in order to limit the propagation area of the information according to the distance from the information origin and the time as described above. In addition, since it is impossible to designate the communication route because of the communication conducted in the state where the locations of the mobile station and the base station are unknown, it is necessary to avoid the occurrence of a situation where the communication quantity is increased due to the overlapping of the transfer paths originating from high densities of both of the mobile stations and base stations. This situation is illustrated in FIG. 6, for example. In FIG. 6, the mobile stations A 601 and B 603 are within an area where the mobile stations are crowded closely, and from one of the mobile stations A 601 and B 603, no information from the same information origin is transferred to the mobile station C 605 in order to reduce the communication quantity. It is satisfactory that the information is transferred to the mobile station C 605 via the mobile stations other than the stations A 601 and B 603.

Although the overlapping of the transfer paths can be prevented by attaching identifiers to the mobile stations and the messages, this is not practical. This causes a problem that the messages become longer. The present invention performs processing for reducing the communication quantity, as well as for selecting the transfer information according to the distance and the time.

Prior to the description of an algorithm for determining whether or not the information is to be transferred, the premise will be described. (a) It is assumed that the mobile stations and the base stations are almost uniformly distributed. Specifically, the average distances between the mobile stations and the base stations are approximately constant, and this average distance is denoted by the symbol D. The method for obtaining the average distance D will be described later. The average distance D may change slowly in some instances. (b) It is assumed that the number of times of transmission within a certain period of time is constant in the base station and every mobile station. This number of times of transmission information is denoted by N. The number of times N also may change slowly in some cases. (c) It is assumed that a communication limitation distance (receiving limitation distance) between two mobile stations and between the mobile station and the base station is constant. This communication limitation distance is denoted by X. The communication limitation distance X may be obtained by actually measuring a radio wave receiving intensity in the mobile stations and the base station. The communication limitation distance X can be set to be a constant as performances of the mobile stations and the base station. Moreover, the communication limitation distance X may be a function of such as communication conditions at the circumferences and moving speeds.

Figure 7:
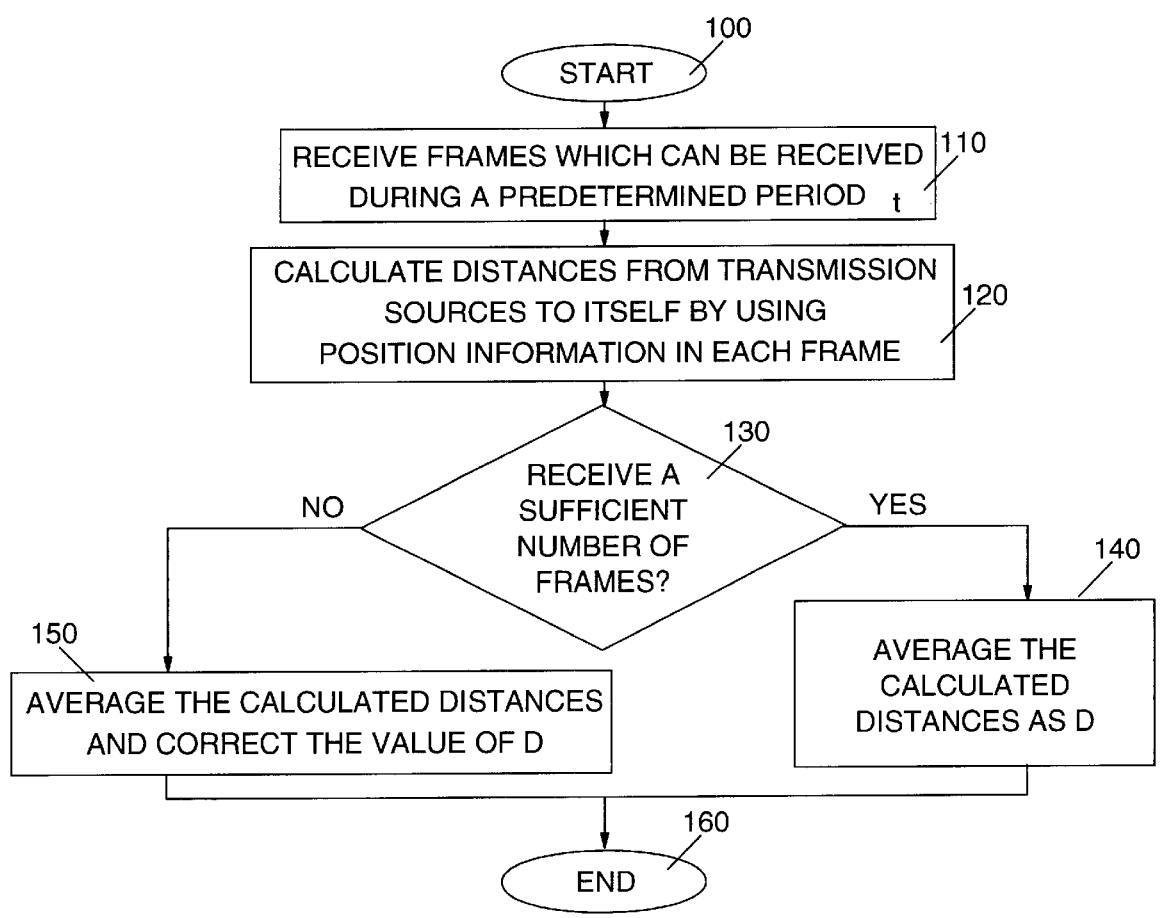
FIG. 7 is a flowchart for computing an average distance D among the mobile stations.

Next, the way to obtain the average distance D will be described (FIG. 7). First, frames which can be received are received within a predetermined period of time t (step 110). The period t shall be sufficiently long enough to satisfy an inequality Nt>1, and shall be sufficiently shorter than the period while the average distance D changes. Using the position information of the transmission source in each frame and the position information from the position detector 25, the distances from the mobile stations or the base stations which have sent out the frame are calculated (step 120). After the predetermined time t has elapsed, it is confirmed whether or not a sufficient number of frames were received (step 130). If the distances for a sufficient number of frames could be calculated, an average of these distances is calculated. The value of the average distance is denoted by D (step 140). On the contrary, if a sufficient number of frames were not received, the calculated distances are averaged. The result of the calculation is corrected by considering the circumstances around the mobile stations such as the velocity, the position and the like (step 150). For example, when moving by a car, it is considered that the correction is performed using the distance between cars in accordance with the velocity. If the number of frames received is too small, it is considered that the value derived from the circumstances around the car is regarded as D, without the correction. Note that since the average distance D changes, this processing should be appropriately performed in accordance with the change of the circumstances and the average distance D should be updated.

Figure 8:
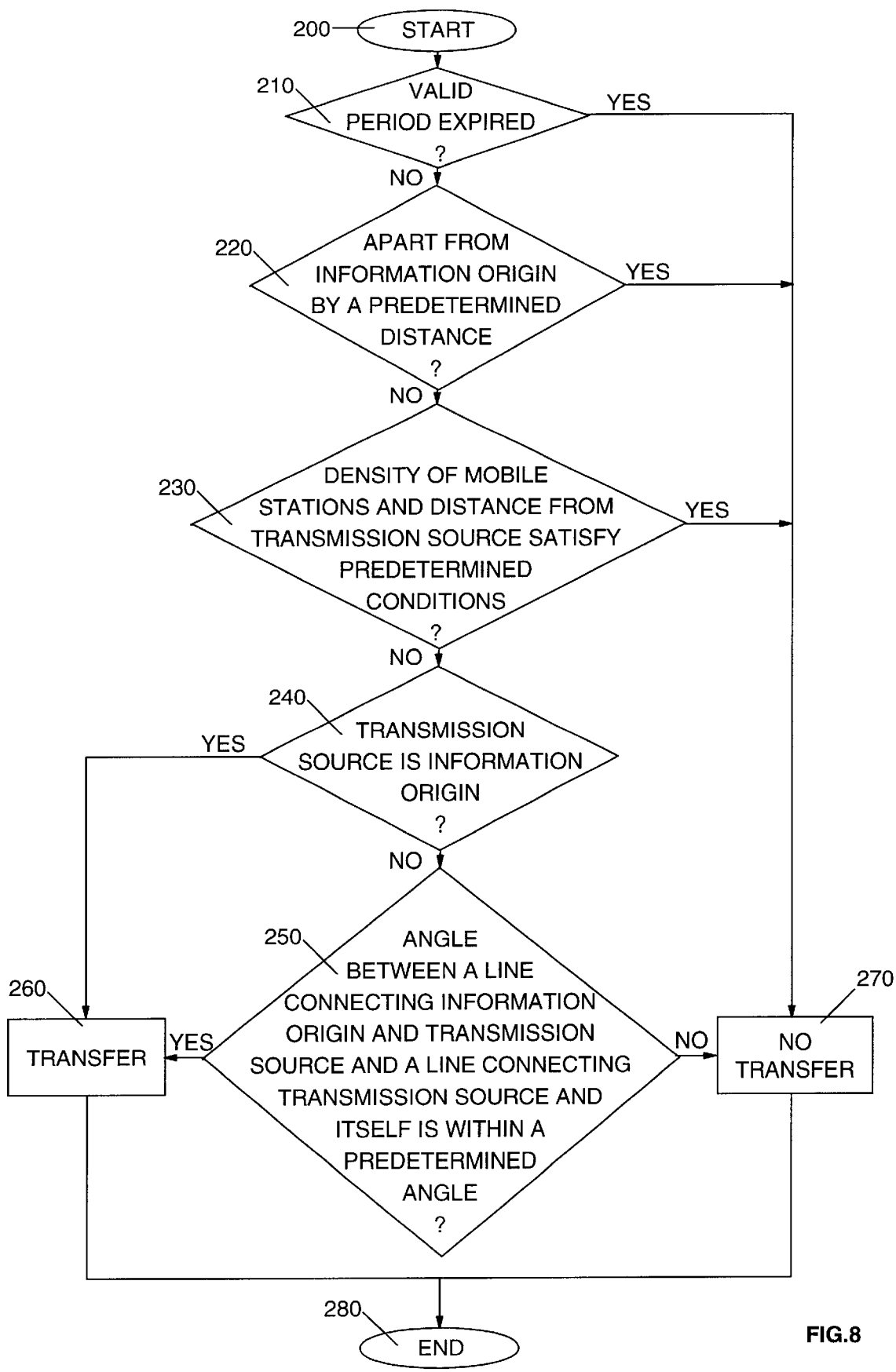
FIG. 8 is a flowchart for processing a judgement whether or not the mobile station transfer the information.

On the premise above described, an algorithm for determining whether or not the information is to be transferred, which is performed by the communication controller 15, will be describe using FIG. 8. First, it is judged whether the valid period of the information to be determined whether it should be transferred (hereinafter referred to as a transfer information) has expired (step 210). If the valid period has expired, the information is not transferred (step 270). The judgment whether or not the valid period has expired is performed in the following manner. Specifically, if a time is included, as a threshold value, in the frame of the transfer information, the judgment is conducted depending on whether or not this time has elapsed. If a time from the transmitting time of the information origin is included, as a threshold value, in the frame of the transfer information, a time at the valid period is obtained, and the judgment is conducted depending on whether or not this has elapsed. To obtain the present time, the time detector 27 is used. Note that the judgment whether or not the valid period has elapsed can be conducted based on a unique standard of the communication controller 15. For example, it is possible to design the communication controller 15 such that it holds the transfer information only for a predetermined period from the transmitting time of the transmission sources or the information origin.

Next, it is judged whether the mobile station itself is apart from the information origin by a predetermined distance or not (step 220). Using the distance included, as the threshold value, in the frame of the transfer information and the position of the information origin included in the frame, it can be judged depending on whether or not the position of the mobile station itself detected by the position detector 25 is positioned within a circle whose radius is equal to the distance as the threshold value and whose center is the information origin. If this mobile station is distant from the information origin by more than a predetermined distance, no transfer of the information is conducted (step 270). Note that the judgment of the possibility of the information transfer as to a distance can be made based on a unique standard of the communication controller 15, similarly to the judgment as to the time. For example, the communication controller 15 can determine depending on the peculiar distance from the transmission source or the information origin whether or not the transfer information is to be discarded.

Furthermore, it is judged whether or not the transmission source is identical to the information origin (step 240). Subsequently, it is judged whether or not the angle between the straight line connecting the information origin and the transmission source and the straight line connecting the transmission source and the mobile station itself is within a predetermined angle (step 250). This implies the condition for propagating the information radially from the information origin so that the transfer paths do not make detours and overlap each other. Assuming that the position vector of the mobile station itself be r, the position vector of the transmission source be s, the origin of which is the information origin, this condition is expressed by the following inequality:

$$((r-s) \cdot s)/(|r-s| \, |s|) > C > 0$$

where C=cos θ, sin θ=D/X.

Figure 9:
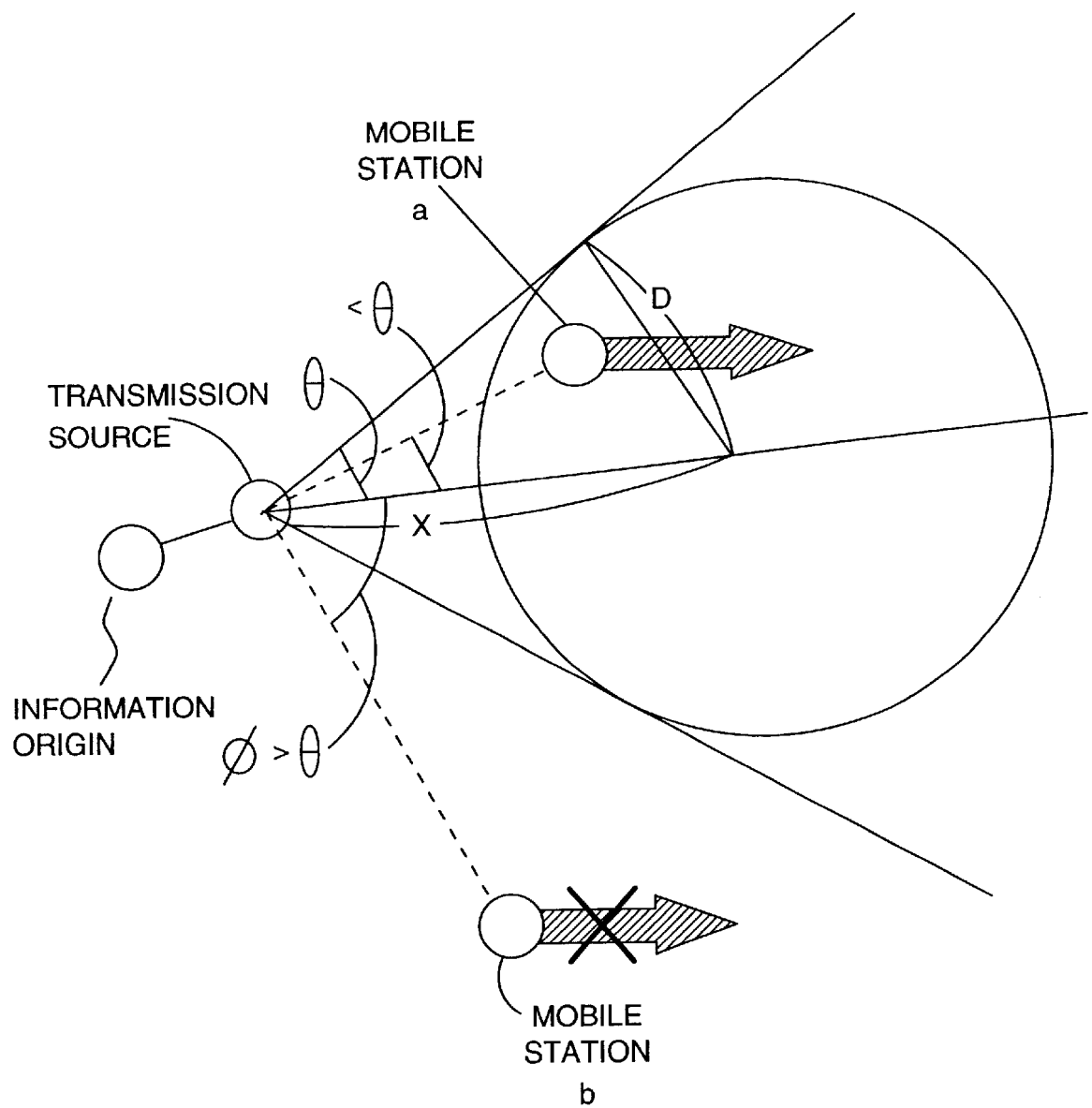
FIG. 9 is a diagram for explaining a step 250 in FIG. 8.

This condition is illustrated as shown in FIG. 9. In FIG. 9, since the mobile station a is within the area of a predetermined angle θ from the straight line connecting the information origin and the transmission source, that is, since ψ<θ is established in this case, the transfer information can be transmitted (step 260). Moreover, this condition can be expressed by whether or not the mobile station a is within the area between the two straight lines, which contact with a circle whose radius is equal to the average distance D and whose center is apart from the transmission source by the receiving limitation distance X and on the straight line connecting the information origin and the transmission source. On the other hand, since the mobile station b is not within the area of the predetermined angle θ, that is, since φ>θ is established in this case, the transfer information is not transmitted (step 270). As an alternative condition, the mobile station itself is within the circle in FIG. 9 and an area which is apart from the transmission source and outside the circle, that is, the condition that the distance of the mobile station from the transmission source is longer than the value obtained by subtracting the average distance from the receiving limitation distance may be adopted.

Note that the above-described inequality is an example, and the predetermined angle θ may be determined independently from the average distance D and the receiving limitation distance X. Furthermore, the possibility of the information transfer can be determined by any one of the steps 210, 220, 230, 240 and 250, or it can be determined by an arbitrary combination of them. Moreover, the order of the steps can be changed arbitrarily. The conditions can be expressed by dividing the formulae into more than two.

When the information is sent out at a place where the density of the mobile stations is extremely high, the case where the information is discarded without transferring it may be expected. In such case, it is sufficient that the information origin sets the threshold value of the distance to be 0 or the transmitting time and the discard time are made to be equal.

By the operation of the communication controller 15 as described above, it is possible to determine for every information the possibility of the information transfer.

Next, the application example of the present invention will be described. It is assumed that the mobile station is a portable information terminal and the personal user has this portable information terminal. For example, the information origin is a retail store, and it sends out special sale information or shop information together with position information. The user holding the portable information terminal may visit the special sale shop upon getting the special sale information. If he does not have an interest in the special sale shop, he will leave the shop. When this user walks onto the street after leaving the shop, his portable information terminals exchanges information with portable information terminals of other users. While repeating the exchange of the information, the information will be received by a user who has interest in the special sale information. The portable information terminal automatically performs such an information transfer similar to a word-of-mouth communication, whereby information collection can be performed. Moreover, by sending out similar information by many shops, the holders of the portable information terminal can compare the special sale information, so that they can buy cheaper goods. Since the information spreads by itself by sending it out to a small number of users without transmitting it to many users at once, the shop which is the information origin can gather customers in a low cost.

Furthermore, facilities for travel may be the information origins. For example, the facilities for travel send out departure and arrival guide information of trains, buses, airplanes and the like. The present invention exhibits effects in the case where schedules of them are disturbed. For example, the portable information terminals possessed by persons in a railway station receive information informing the delay of the train from the traffic facility, and if the persons in the railway station move, the information is spread around the station. Moreover, if the mobile station set in the bus receives information informing the delay of the train, or if a person holding a portable information terminal which has received the information informing the delay of the train gets on the bus, this information is transmitted along the bus route. If a portable information terminal of a person at the bus stop waiting for a bus running towards the station receives information informing of the delay of the train, that person may think of using traffic facilities other than the train and not getting on the bus. As described above, if such situation occurs suddenly, it becomes possible to transmit local and real time information which can not be dealt with by televisions and radio broadcasts. Furthermore, it becomes possible to avoid the occurrence of a situation where the station is over crowded by people.

Furthermore as still another example, the mobile station may be a car. In this case, a portable information terminal is connected to the car, or a car navigation system possesses the function of the mobile station. The information origin may be a gas station or a parking zone. In the case of the gas station, the information origin transmits information concerning the location of the gas station and the cost of the gasoline. In case of the parking zone, the information origin transmits information concerning the vacant space. The information propagates from one car to another. For example, the information is transmitted from the car needing no oil supply to the car needing it, and the information is transmitted from the car planning for no parking to the car planning for it. In the parking zone and the gas station, information concerning restaurants, special sale information from retail stores and information concerning sight-seeing guides for this area can be acquired from other cars.

The transmission of the traffic information disclosed in the background arts may be employed. The traffic jam information is more localized and changes in real time, and it is transmissible by communications among the cars. Note that the users can serve as the information origin using an input device. Specifically, the users can immediately transmit information concerning an accident occurring by the car before their eyes to other cars, by inputting this information to the input device. Moreover, if the user has an image acquisition device such as digital cameras, it also becomes possible to transmit the acquired image to other mobile stations.

The present invention provides a method for controlling a transmission of information in a more suitable form. It also limits the transmission of the information to a predetermined area. Moreover, the present invention also avoids congestion of information to be transmitted. Still furthermore, the present invention achieves the more efficient transmission of the information.

What is claimed is:

1. A method for determining in a mobile wireless transceiver whether received information including position information of an information origin is to be transferred, said method comprising the steps of:

calculating a distance from said information origin using said position information;

comparing said distance with a predetermined threshold value; and determining that said received information is not to be transferred if said distance is the same as or longer than said predetermined threshold value.

2. A method for determining in a mobile wireless transceiver whether received information including position information of a transmission source is to be transferred or not, comprising the steps of:

detecting a density of the mobile wireless transceivers in the vicinity;

calculating a distance from said transmission source by using the position information of said transmission source;

judging whether said density and said distance satisfy a predetermined condition; and, determining that said received information is not to be transferred if said predetermined condition is satisfied.

3. The method according to claim 2, wherein said step of judging whether said density and said distance satisfy a predetermined condition includes a step of determining whether said density is greater than or equal to a predetermined value and said distance is less than or equal to a predetermined value.

4. The method according to claim 2, wherein the step of judging whether said density and said distance satisfy a predetermined condition includes a step of determining whether said density and said distance satisfy a predetermined relationship equation.

5. A method for determining in a mobile wireless transceiver whether received information including position information of an information origin and position information of a transmission source is to be transferred, said information origin primarily transmitting information, said method comprising the steps of:

judging whether an angle between a first line connecting said information origin and said transmission source and a second line connecting said transmission source and the mobile wireless transceiver itself is within a predetermined angle, by using said position information of said information origin and said position information of said transmission source;

determining that said received information is not to be transferred if said angle between said first and second lines is not within said predetermined angle; and wherein said predetermined angle is determined based on a density of said mobile wireless transceivers in a proximate vicinity.

6. A mobile wireless transceiver comprising:

a receiver for receiving a wireless signal of transfer information including position information of a transmission source;

a transmitter for transmitting the wireless signal;

a position detector for detecting a position of the mobile wireless transceiver itself; and, a controller for calculating a distance from the position of said transmission source to the position of said mobile wireless transceiver by using position information of said transmission source, detecting a density of the mobile wireless transceivers existing in the vicinity by using position information of said transmission sources of a plurality of wireless signals received by said receiver, judging whether said density and said distance satisfy predetermined conditions, and determining that said transfer information is not to be transmitted by said transmitter if said predetermined conditions are satisfied.

7. The mobile wireless transceiver according to claim 6, wherein said controller judges whether said density is greater than or equal to a predetermined value and said distance is less than or equal to a predetermined value.

8. The mobile wireless transceiver according to claim 6, wherein said controller judges whether said density and said distance satisfy a predetermined relationship.

9. A mobile wireless transceiver comprising:

a receiver for receiving a wireless signal of transfer information including position information of an information origin initially transmitting information and position information of a transmission source;

a detector for detecting a position of the mobile wireless transceiver itself;

a transmitter for transmitting a wireless signal; and, a controller for judging whether an angle between a first line connecting said information origin and said transmission source and a second line connecting said transmission source and said mobile wireless transceiver itself is within a predetermined angle by using said position information of said information origin and the position information of said transmission source, and determining that said transfer information is not to be transferred by said transmitter if said angle between said first and second lines is not within said predetermined angle wherein said predetermined angle is determined based on a density of mobile wireless transceivers in the vicinity which is obtained by using the position information of said transmission sources of a plurality of wireless signals received by said receiver.

* * * * *

UNITED STATES PATENT AND TRADEMARK OFFICE
CERTIFICATE OF CORRECTION

PATENT NO. : 6,477,353 B1
APPLICATION NO. : 09/260246
DATED : November 5, 2002
INVENTOR(S) : Honda Ryohji, Kitayama Fumihiko and Kuse Kazushi It is certified that error appears in the above-identified patent and that said Letters Patent is hereby corrected as shown below:

On the title page, item (75) Inventors, "Honda Ryohjj" should read --Honda Ryohji--

Signed and Sealed this
Twenty-eighth Day of May, 2013

Teresa Stanek Rea
*Acting Director of the United States Patent and Trademark Office*